(12) United States Patent
Walker et al.

(10) Patent No.: US 6,231,034 B1
(45) Date of Patent: May 15, 2001

(54) DOOR MOUNTING APPARATUS

(75) Inventors: Michael R. Walker, 790 S. Atmore Cir., Deltona, FL (US) 32725; James R. Walker, Allegan, MI (US)

(73) Assignee: Michael R. Walker, Deltona, FL (US)

( * ) Notice: Subject to any disclaimer, the term of this patent is extended or adjusted under 35 U.S.C. 154(b) by 0 days.

(21) Appl. No.: 09/428,212

(22) Filed: Oct. 27, 1999

(51) Int. Cl.[7] ..................................................... B25H 1/08
(52) U.S. Cl. ........................ 269/17; 269/152; 269/901; 269/909; 269/905
(58) Field of Search ............................. 269/17, 901, 905, 269/152, 904, 303; 414/10–11

(56) References Cited

U.S. PATENT DOCUMENTS 2,503,388 * 4/1950 Hedlund ................................ 269/905
5,048,806 * 9/1991 Deutsch et al. ....................... 269/905

OTHER PUBLICATIONS

Norfield Industries Buyer's Guide 1999–2000 p. 63.

* cited by examiner

Primary Examiner—Robert C. Watson
(74) Attorney, Agent, or Firm—William M. Hobby, III

(57) ABSTRACT

A door mounting tool is used for mounting a door to a door jamb and includes a frame having a base frame member for holding the base of a door and an end frame member hingedly attached to the base frame member for holding one edge of a door. A plurality of door holding members are movably attached to the frame for locking the door to the base frame member and to the end frame member. A plurality of side support members may be either hingedly or fixedly attached to the side of the base frame member and each has an adjustable leg extending therefrom for adjusting the height of the base frame member adjacent a door jamb. There is at least one wheel mounted to the base frame member at one end thereof for rolling the frame therein when a door is attached thereto so that a door can be mounted to the door mounting tool and positioned for hanging the door to a door jamb and for moving the door around a job site like a door cart or dolly. The base frame member and the end frame member are each U-channels hinged together and the plurality of door holding members are threaded through one side of each U-channel member for driving the edge of a door against one edge of each U-frame member. The end frame member can be folded onto the base frame member and the plurality of side support members folded adjacent the base frame member for storage of the door mounting tool.

12 Claims, 3 Drawing Sheets

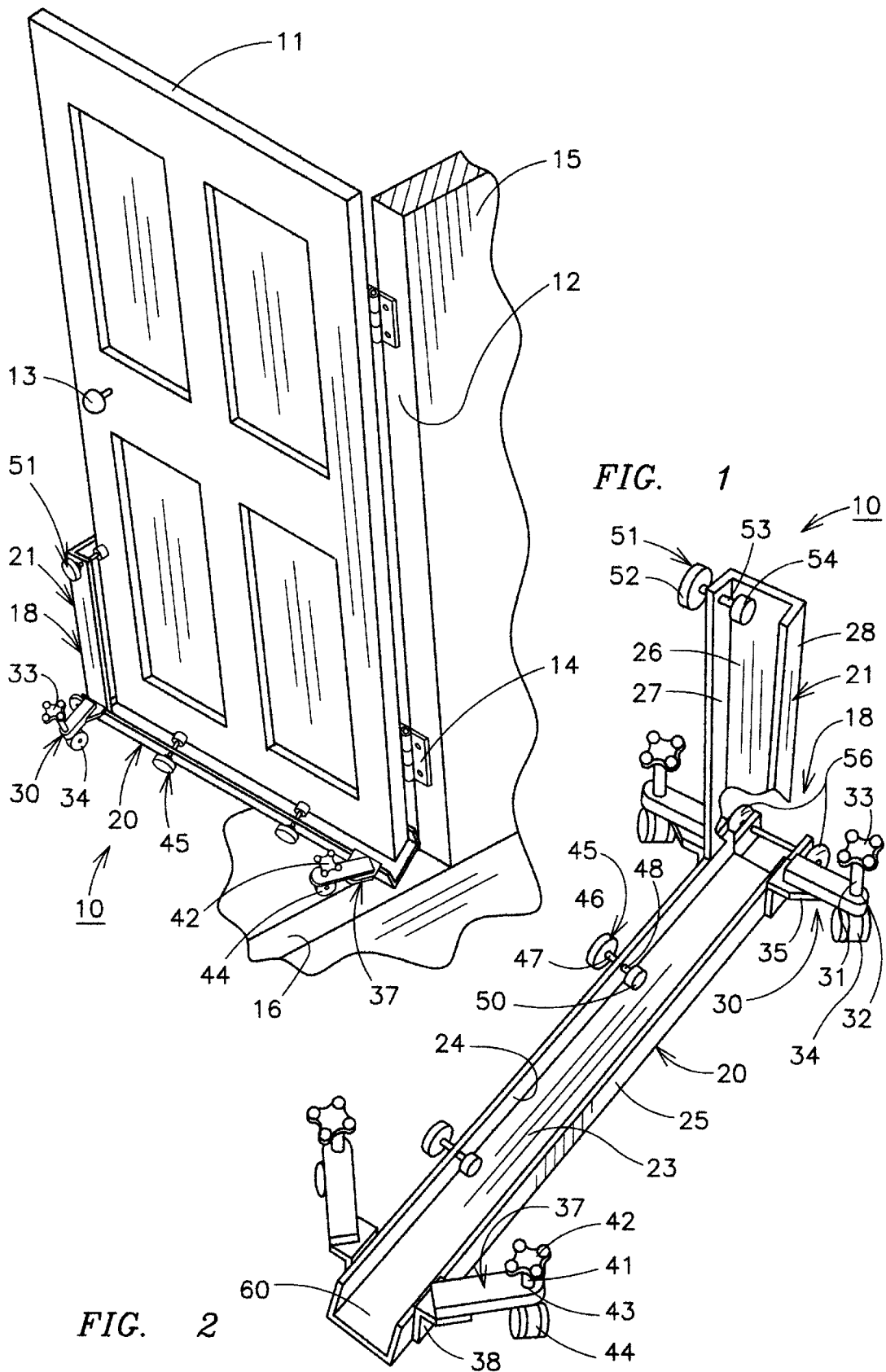

DOOR MOUNTING APPARATUS

BACKGROUND OF THE INVENTION

The present invention relates to a door mounting tool and especially to a door mounting tool for mounting a door to a door jamb.

Carpenters have to fit and hang doors to door openings in buildings. This sometimes requires hanging a door in an existing jamb when only the door needs replacing and other times requires the installation of a new door jamb and door. The door has to be mounted to the door jamb and this is accomplished by positioning the door in the door opening and then using small wooden door shims and pry bars to raise and position the door to a position for mounting the door. The door must then be mounted to the jamb again using door shims and pry bars to position the door in the exact position for attaching the hinges.

Prior U.S. patents which assist in hanging doors include the Niederholtmeyer patent, U.S. Pat. No. 3,642,251, for a Door Jack to facilitate the installation of doors. An elongated pry bar is provided having a pry foot at the lower end and is used to maintain the door in the desired elevated position for installation of the hinges. The jack may also be used for carrying the door to the installation site. The Almond patent, U.S. No. 4,043,536, is a rollable jack for positioning the door in lateral and vertical alignments for hanging the door on hinges while leaving the hands free to perform the hanging operations. The jack includes an elongated handle having a bracket attached thereto and a stirrup for inserting the foot to pivot the jack to raise the door to the level of the door hinges for positioning the mounting pins in the hinges. In the Wheeler patent, U.S. Pat. No. 4,010,931, a Door Lifting and Holding Tool enables the user to lift and position a door and includes a frame member having a lever member pivotally attached to a fulcrum and means for elevating the frame above a supporting surface. In the Schaefer patent, U.S. Pat. No. 3,871,054, a Dolly and method of using it to hang a door is provided which has a U-shaped door receiving frame with outwardly extending lever arms. Wheels are attached to the frame such that by stepping on one end of the lever arms, the frame is swung to lift the door supported on the dolly to align the hinges with the hinges on a door frame. In the Pope patent, U.S. Pat. No. 4,712,819, a tool for lifting doors is provided to facilitate installation of the doors. The tool has a pair of fingers affixed to a horizontally extending arm for gripping opposite sides of the door panel or other member when a lifting force is applied to the handle. In the Wheeler patent, U.S. Pat. No. 4,010,931, a door lifting and holding device includes a hollow frame member for resting on a supporting surface. A portion of the frame member is inserted under the edge of the door for lifting the door.

The present invention is directed towards a door holding, lifting and setting tool for holding a door in position for mounting the door and which can be used to move the door from place to place as well as to support the door while working on the door. The tool can be folded into a storage position when not in use.

SUMMARY OF THE INVENTION

A door mounting tool is used for mounting a door to a door jamb and includes a frame having a base frame member for holding the base of a door and an end frame member hingedly attached to the base frame member for holding one edge of a door. A plurality of door holding members are movably attached to the frame for locking the door to the base frame member and to the end frame member. A plurality of side support members are hingedly attached to the side of the base frame member and each has an adjustable leg extending therefrom for adjusting the height of the base frame member adjacent a door jamb. There are two wheels mounted to the base frame member at one end thereof for rolling the frame therein when a door is attached thereto so that a door can be mounted to the door mounting tool and positioned for hanging the door to a door jamb. The base frame member and the end frame member are each U-channels hinged together and the plurality of door holding members are threaded through one side of each U-channel member for driving the edge of a door against one edge of each U-frame member. The end frame member can be folded onto the base frame member and the plurality of side support members folded adjacent the base frame member for storage of the door mounting tool.

BRIEF DESCRIPTION OF THE DRAWINGS

Other objects, features, and advantages of the present invention will be apparent from the written description and the drawings in which:

FIG. 1 is a perspective view of a door attached to the door mounting tool of the present invention;

FIG. 2 is a perspective view of the door mounting tool of FIG. 1;

DETAILED DESCRIPTION OF THE PREFERRED EMBODIMENT

Figure 3:
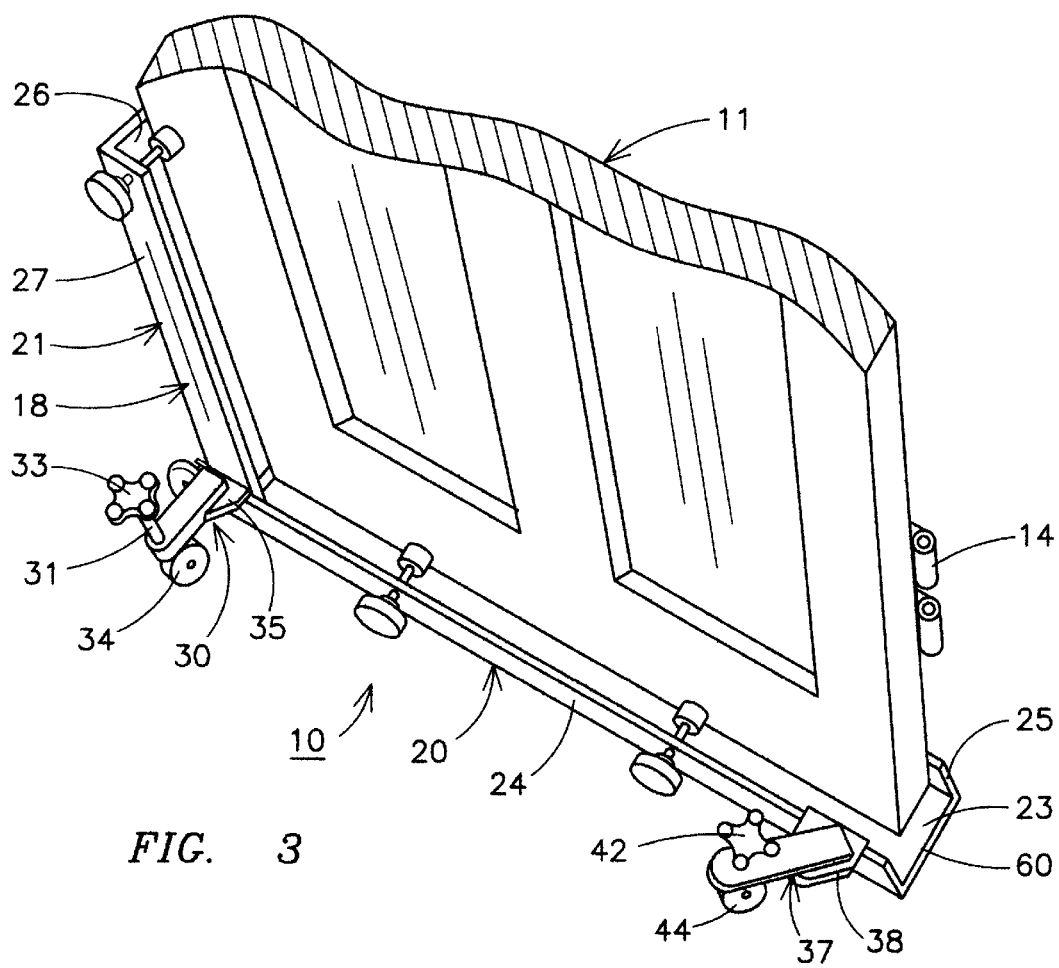
FIG. 3 is a partial perspective view of a door mounting tool of FIG. 2 attached to a door.
Figure 4:
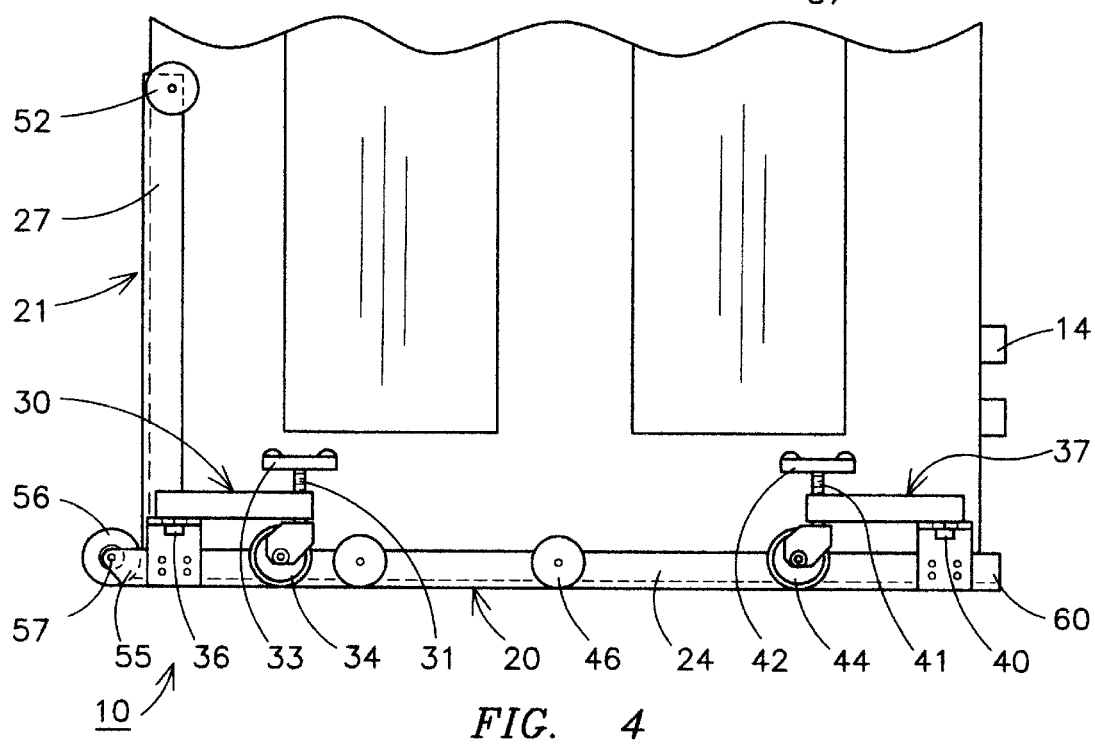
FIG. 4 is a side elevation of the door mounting tool having a door attached in accordance with FIG. 3.
Figure 5:
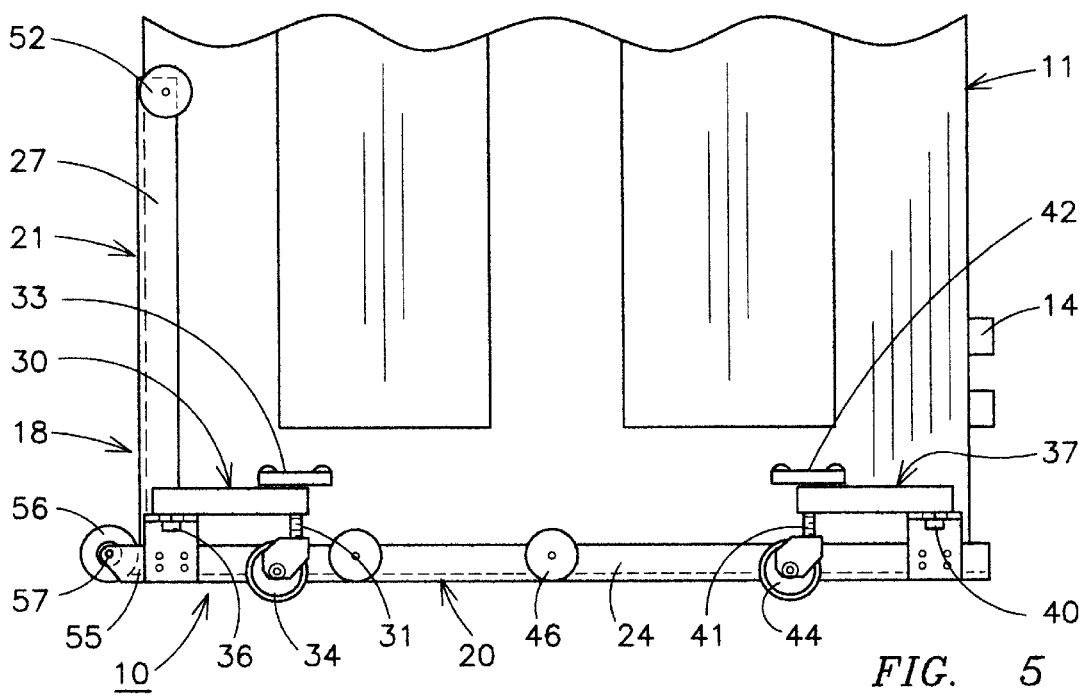
FIG. 5 is a side elevation of the door mounting tool and door of FIG. 4 having the legs in a position to raise the position of the door.
Figure 6:
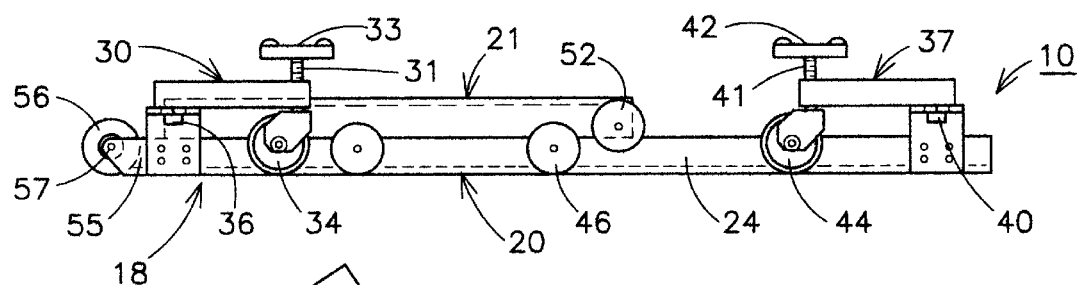
FIG. 6 is a side elevation of the door hanging tool of FIGS. 1–5 in a folded storage position.

Referring to the drawings FIGS. 1–3, a door mounting tool 10 is used for mounting a door 11 to a door jamb 12. The door 11 has four door panels and a door knob 13 and is mounted with a pair of butt hinges 14 to the jamb 12 of the wall 15. The door 11 is mounted above the threshold 16 adjacent the building floor 17. The door mounting tool 10 has a frame 18 having a base frame 20 and an end frame 21 hinged to the base frame 20. The base frame 20 and the end frame 21 are both formed with U-channels. The base frame 20 has a floor 23 and a pair of sides 24 and 25 while the end frame U-channel 21 has a floor 26 and a pair or sides 27 and 28. A pair of rear side support frame members 30 each has a threaded rod 31 threadedly attached through an opening 32 in the frame member 30 and has a handle 33 on one end and a caster 34 on the other end thereof. Each side support member 30 is hingedly attached to a bracket 35 with a hinge pin 36, as seen in FIG. 4. The side support frame members 30 may also be fixedly attached to the bracket 35 such as by welding. The base frame 20 also has a pair of front side support members 37 each hingedly attached to a frame bracket 38 with a hinge pin 40, as seen in FIGS. 4, 5 and 6. Each front side support member 37 has a threaded rod 41 having a handle 42 and being threadedly attached through the threaded opening 43 and has a caster 44 attached to the end thereof. Thus, the front supporting members 37 and the rear supporting members 30 can be folded from a closed and storage position, as shown in FIG. 6, to an open position, as illustrated in FIG. 2. The handles 33 and 42 can be rotated to adjust the height of the casters 34 and 44 to raise and lower the frame 18.

The base frame 20 has a pair of door holding members 45 each having a handle 46 and a threaded rod 47 threaded through a threaded opening 48. Each rod has a pad 50 mounted on the end thereof. Similarly, the end frame 21 has a door holding member 51 having a handle 52 thereon and a threaded rod 53 threaded through the U-channel side 27 and having a padded end 54. In addition, the base frame 20 has a wheel mounted bracket 55 extending from the rear end thereof and supporting one or more wheels 56 with an axle 57. The wheel, as seen in FIG. 4, is mounted above the bottom 58 of the base frame member 20 so that it is only operative as a wheel when the front end 60 of the base frame is lifted to tilt the tool 10, as shown in FIG. 7.

Figure 7:
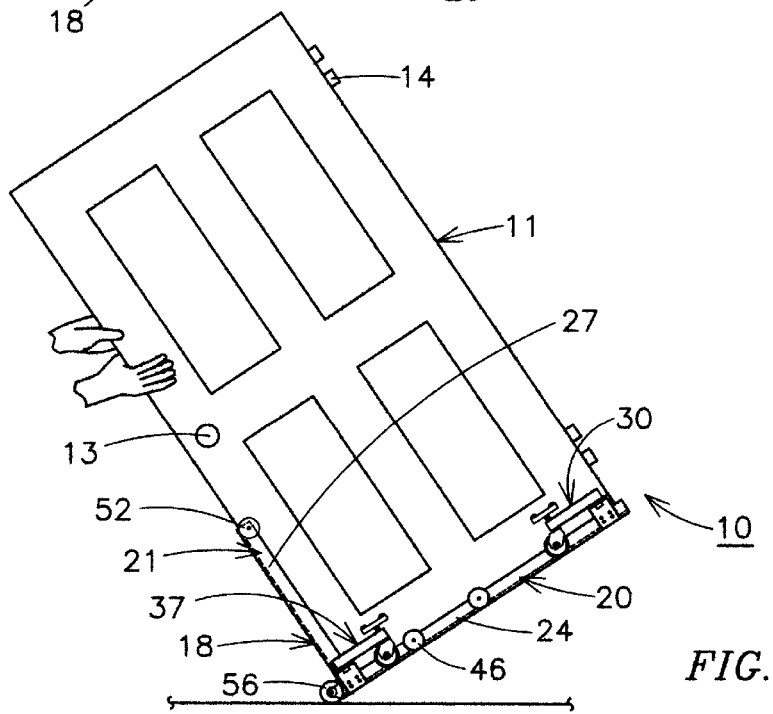
FIG. 7 is a side elevation of a door mounting tool of FIGS. 1–6 having a door attached thereto for being moved to a work site.

In operation, the door mounting tool 10 can be opened as shown in FIG. 2 and have a door 11 slid into the U-channel frame members 20 and 21, as seen in FIGS. 3, 4, 5 and 7. The door holding members 45 can then be tightened by rotating the handles 46 to drive the pads 50 against the door seen in FIG. 3. Similarly, the door holding member 51 can be threaded by turning the handle 52 to drive the pad 54 against the door 11. This locks the door between the pads 50 and 54 and the U-channel side 25 of the base frame and 28 of the end frame member. Once the door is locked in place, it can be wheeled by tilting it on the wheel 56, as shown in FIG. 7, to move the door between locations. When mounting the door, as seen in FIG. 1, the handles 33 and 42 of the adjustable legs 31 and 41 move the casters 34 and 44 up and down to adjust the position of the door for mounting the hinges, as seen in FIG. 1. The door can be adjusted for a test fit by screwing the hinges 14 to the door 11 and removing the tool 10 by sliding it out from under door and closing the door. If more work is needed to fit the door to the opening, then the tool 10 can be reattached to the bottom of the door at which point the door can be rolled to a different position and held within the door mounting tool 10 while planing or cutting or even routing new depths for the hinges. The door 11 can then be rolled back into position, as seen in FIG. 1, and the hinges mounted to mount the door. Once the door is mounted, the door holding members 45 and 51 can be loosened and the casters 34 and 44 raised to lower the frame 10 relative to the floor 17 and the door mounting tool slid from under the door.

It will also be clear that the door mounting tool 10 can be utilized for removing and resetting existing doors as well as for replacing existing doors or in new construction for mounting new doors. The door mounting tool 10 is easily stored in a folding position, as seen in FIG. 6, and can be rapidly opened, as seen in FIG. 2, and attached to a door 11, as seen in FIG. 1. This reduces the time required for installing new doors or resetting old doors into a door opening and allows the door to be conveniently supported while working on the door and eases the installation of a door without the use of shims, pry bars and the like.

It should however be clear that the present invention is not to be limited to the forms shown which are to be considered illustrative rather than restrictive.

I claim:

1. A door mounting apparatus for mounting a door to a door jamb comprising:

a frame having a base frame member having two ends for holding the base of a door and an end frame member hingedly attached to said base frame member for holding one edge of a door, said end frame member being movable between a door holding position and a folded position;

a plurality of door holding members movably attached to said frame for holding a door thereto;

a plurality of side support members attached to said base frame member, each said side support member having an adjustable leg extending therefrom for adjusting the height of said base frame member adjacent a door jamb; and a wheel mounted to one end of said base frame member for rolling said frame and a door mounted therein when said frame member is tilted on said wheel whereby a door can be mounted to said frame and positioned for hanging said door to a door jamb and for moving the door around a job site.

2. A door mounting apparatus for mounting a door to a door jamb in accordance with claim 1 in which each said leg is a threaded rod having two ends and having a caster on one end thereof.

3. A door mounting apparatus for mounting a door to a door jamb in accordance with claim 2 in which each said leg is threaded through one side support member.

4. A door mounting apparatus for mounting a door to a door jamb in accordance with claim 3 in which each said leg rod has a handle on the other end thereof.

5. A door mounting apparatus for mounting a door to a door jamb in accordance with claim 4 in which a plurality of said side support members are movably attached to said base frame member for rotating thereon between a supporting position and a storage position.

6. A door mounting apparatus for mounting a door to a door jamb in accordance with claim 5 in which base frame member is a U-channel having a bottom and two sides.

7. A door mounting apparatus for mounting a door to a door jamb in accordance with claim 6 in which said end frame member is a U-channel having a bottom and two sides.

8. A door mounting apparatus for mounting a door to a door jamb in accordance with claim 7 in which each of said door holding members has a threaded rod having two ends and has a padded surface on one end thereof.

9. A door mounting apparatus for mounting a door to a door jamb in accordance with claim 8 in which each of said door holding members threaded rod has a handle on the other end thereof.

10. A door mounting apparatus for mounting a door to a door jamb in accordance with claim 9 in which a plurality of said door holding members are threadedly attached through one side of said base frame member U-channel.

11. A door mounting apparatus for mounting a door to a door jamb in accordance with claim 9 in which at least one of said door holding members is threadedly attached through one side of said end frame member U-channel.

12. A door mounting apparatus for mounting a door to a door jamb in accordance with claim 11 in which each door holding member rod has a handle on the other end thereof.

* * * * *